United States Patent [19]

MacPhail

[11] Patent Number: 5,063,495
[45] Date of Patent: Nov. 5, 1991

[54] METHOD OF ASSOCIATING DOCUMENT PROCESSING STATES WITH AN ACTION MARKET

[75] Inventor: Margaret G. MacPhail, Austin, Tex.

[73] Assignee: International Business Machines Corporation, Armonk, N.Y.

[21] Appl. No.: 289,992

[22] Filed: Dec. 21, 1988

[51] Int. Cl.⁵ .................................. G06F 7/10
[52] U.S. Cl. .................................. 395/650; 364/927.2; 364/939.2; 364/939.3; 364/940.62; 364/260; 364/284; 364/282.1; 364/281.3; 364/281.6; 364/281; 364/281.8; 364/225.6; 364/225.8; 364/286.1; 364/286; 364/225; 364/DIG. 1; 364/DIG. 2
[58] Field of Search ... 364/200 MS File, 900 MS File, 364/518, 521

[56] References Cited

U.S. PATENT DOCUMENTS

| | | | |
|---|---|---|---|
| 4,503,499 | 3/1985 | Mason et al. | 364/200 |
| 4,532,588 | 6/1985 | Foster | 364/200 |
| 4,633,430 | 12/1986 | Cooper | 364/900 |
| 4,813,010 | 3/1989 | Okamoto et al. | 364/900 |
| 4,815,029 | 3/1989 | Barker et al. | 364/900 |
| 4,827,447 | 5/1989 | Croes et al. | 364/900 |

Primary Examiner—Thomas C. Lee
Assistant Examiner—Eric Coleman
Attorney, Agent, or Firm—H. St. Julian; Douglas H. Lefeve

[57] ABSTRACT

This invention relates to marking a document with action markers and specifying an action to be performed by a responding end user. Notification criteria, notify ID and a status, which are associated with the action to be performed, are also specified. Upon the completion of the action specified, the responding end user updates the status and a message is automatically generated and transmitted to an end user associated with the notify ID if the updated status meets the notification criteria.

10 Claims, 5 Drawing Sheets

METHOD OF ASSOCIATING DOCUMENT PROCESSING STATES WITH AN ACTION MARKET

CROSS-REFERENCES TO RELATED APPLICATIONS

This application is related in subject matter to the following applications filed concurrently herewith and assigned to a common assignee:

Application Ser. No. 07/289,991 filed by M. G. MacPhail entitled "Method of Associating Another Document With An Action Marker".

Application Ser. No. 07/290,014 filed by M. G. MacPhail entitled "Method of Marking a Document for Action".

TECHNICAL FIELD

This invention relates to a method of associating status with an action marker and more particularly, to a method of specifying notification criteria to be associated with a document upon the completion of the review thereof by a responding end user.

BACKGROUND INFORMATION

The use of personal computers has increased both in the home and in business. In recent times, the growth of personal computers in business has been explosive. A great majority of workers now utilize terminals to perform their respective jobs. Moreover, the exchange of information between employees within an office or within offices remotely connected has become commonplace through the use of networks. Faster, larger and more reliable networking and distribution systems are being developed. The use of networks has reduced the cost associated with expensive I/O devices such as large DASD devices by making these devices available to all of the users throughout a network. Although networks have coupled users together, new applications are still needed which focus on making tasks performed by a group of users more productive.

DISCLOSURE OF THE INVENTION

This invention relates to a method of marking a document for review and specifying status and notification criteria whereby an automatic response is generated upon the updating of the status to match the notification criteria. A requesting EU marks a section of a document to be reviewed by a responding EU. The action to be performed by the responding EU, an identification of the responding EU and a due date, which are specified by the requesting EU, becomes a part of the document and are associated with a begin action marker and an end action marker. The requesting EU also specifies notification criteria, notify ID and status for the action to be performed. Multiple sections can be marked for, review by the same responding EU or other responding EUs. After the document has been marked, the document is filed and the responding EU or EUs may be given access to the document to complete the review thereof. Alternately, the document can be transmitted to the responding EU or EUs for review. When the responding EU or EUs have complete their respective review of the document, the status associated with the action is updated. If the updated status is the same as the notification criteria, a message is automatically transmitted to the end user associated with the notify ID.

BEST MODE FOR CARRYING OUT THE INVENTION

Figure 1:
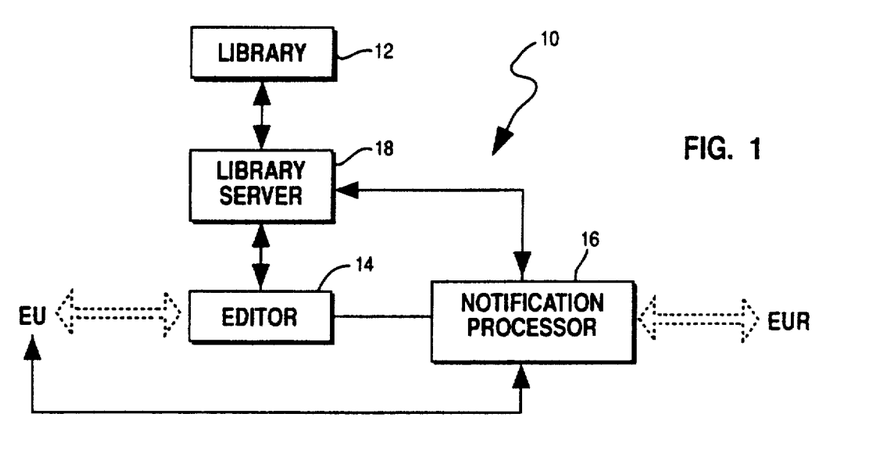
FIG. 1 is a block diagram of a document management system in accordance with the principles of the present invention.

FIG. 1 shows a document management system 10 which controls the creation, retrieval, editing and distribution of documents within an information processing sysrem (not shown). Documents which are created by an end user (EU) are stored in a library 12. The library 12 performs various services for the system 10. These services are used for storing and retrieving documents electronically. Whenever a document is filed in the library 12, a set of descriptors called a document profile is filed with it. The document profile contains descriptors such as a name under which the document is filed, author/owner of the document, the subject of the document and the date the document was filed in the library. Document profiles that facilitate the searching for documents are filed in the library 12.

The library 12 also provides the following services: deleting documents from the library; updating work in progress documents in the library; specifying a security level to be associated with the document which is being filed; allowing authorized end users other than the author/owner to retrieve a document from the library; and performing searches for and retrieving documents filed in the library for other end users.

The EU may retrieve documents, which were previously stored in the library 12, for editing and/or distribution by interacting with a text editor 14. The text editor 14 in the preferred embodiment of the present invention supports a uniform data stream for documents created, stored and edited thereby. The uniform datastream, which is supported by text editor 14 and which is well known in the art, is document content architecture. Text editors supporting document content architecture either support a final form text format or revisable form text format. The text editor 14, in the preferred embodiment, supports the revisable form text format. Since the details of text editors, which support the revisable form text format are well known in the art, they will not explained further herein.

After retrieving a document from the library 12 or creating a new document, the EU may mark at least one selected portion thereof and specify an action to be subsequently performed by another end user. The EU accomplishes this by invoking an action marker function which is available through the editor 14. Additionally, the EU may invoke a function to notify a responding end user (EUR) to perform the specified action. The notify function either may be performed within the text editor 14 or through the use of a notify processor 16 which is external to the text editor. The EU interacts with the notify processor 16 to select an existing message or to generate a new message to be transmitted to the EUR. Moreover, the EU specifies notification criteria so that an appropriate user is notified when the specified action is completed and indicates whether a copy of the document, as marked, is to be transmitted to the EUR. When the action marker is first generated, an "open" action status is associated therewith. When the EUR completes the review of the document, as marked, a completion date is entered into the action marker data area associated with the action marker along with a change of status to "completed". If the notification criteria is so specified, the appropriate user will be notified with a message upon completion of the specified action. Alternately, instead of transmitting the document, as marked, and any related documents to the EUR, the EU may choose to give access to the EUR to a copy of the document filed in the library 12. If the document, as marked, is to be transmitted to the EUR, the notify processor 16 interacts with library server 18 to retrieve the documents from the library 12. Thereafter, the notify processor 16 transmits the selected or generated message and the retrieved documents to the EUR. It should be understood that the EUR may be within the same system or remotely coupled to the EU by a network (not shown).

Figure 2:
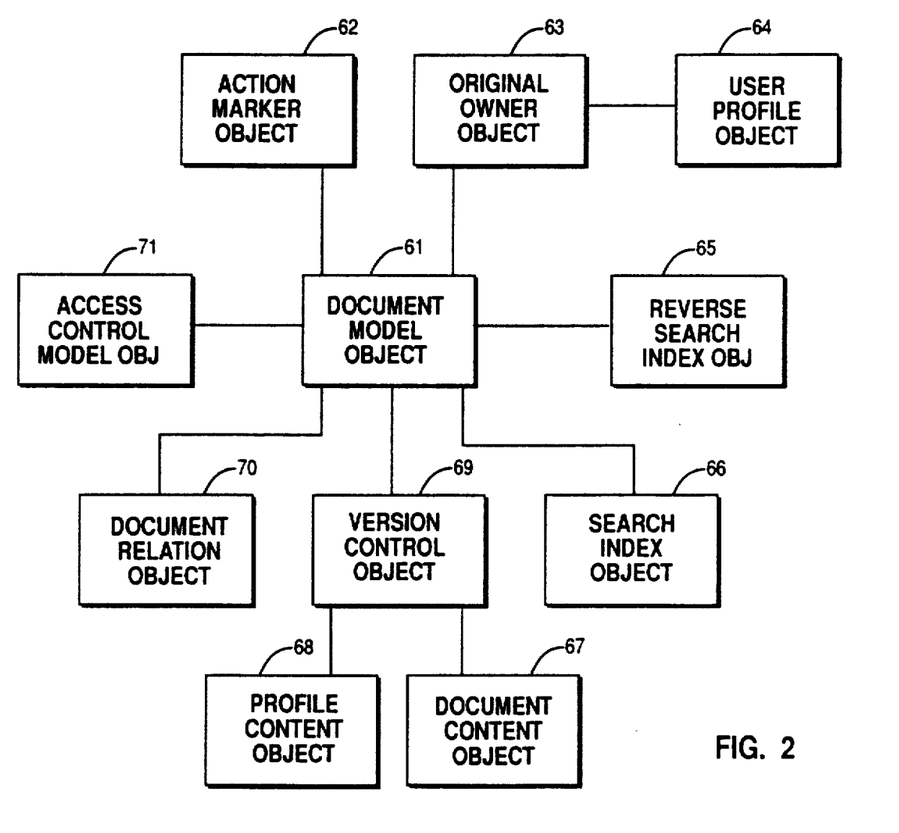
FIG. 2 is a model of a document showing the various objects associated with the document stored in the system of FIG. 1 in accordance with the principles of the present invention.

Referring to FIG. 2, each document filed in the library 12 includes the Document Model Object 61, the Action Marker Object 62, the Original Owner Object 63, the User Profile Object 64, the Reverse Search Index Object 65, the Search Index Object 66, the Document Content Object 67, the Profile Content Object 68, the Version Control Object 69, the Document Relation Object 70, and the Access Control Model Object 71 shown therein. All of the objects shown in FIG. 2 are created in response to processing a FILE command.

The model object 61 contains information concerning ownership and attributes of a specific document. This object controls the access to the document during its life in the library 12.

The original owner object 63 contains or points to information used by an owner of the document to control access to the document as filed.

The document content object 67 provides for the storage of the document content and for saving information relating to the actual size of the filed document.

The document relation object 70 describes the logical relationship between the document and other documents. If the document is a folder document, each of the documents contained therein has a pointer or library assigned document name (LADN) entry in this object. If this document is in one or more folder documents, then each folder document has a pointer or LADN entry in this object. Enter and remove history may be maintained for the document as a folder document or as a document in other folders.

The access control model object 71 is created when the document owner authorizes other users to access the document.

The action marker model object 62 provides for constructs for the beginning and the end of portions marked in a document. This object also provides for data area where an end user may specify, the responding end user, due date, action to be performed, notification, status request and specification of any related documents.

Structures for all of the above-identifed objects are a part of a DISOSS office system marketed by International Business Machines Corporation and will not be described herein.

Referring again to FIG. 1, the editor 14 includes a plurality of functions associated with action markers. The action marker functions may be displayed to the requesting EU on a display unit (not shown) included in document management system 10. Further, the action marker functions may be displayed as items on an action bar on the display unit or as items on a pop-up menu. The action marker functions may be selected by using a pointing device, a keyboard or a touch sensitive screen included as a part of the document management system 10. Alternately, each of the action marker functions may be associated with a selected one of a plurality of function keys on the keyboard. A selected one of the action marker functions facilitates the invocation of an action marker application program.

Figure 3:
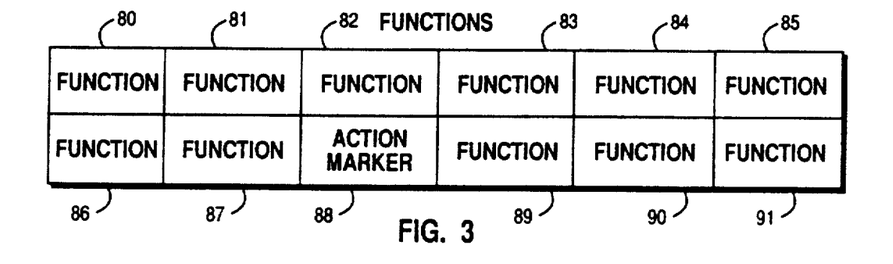
FIG. 3 shows a menu of document management system functions including the action marker function of this invention.
Figure 4A:
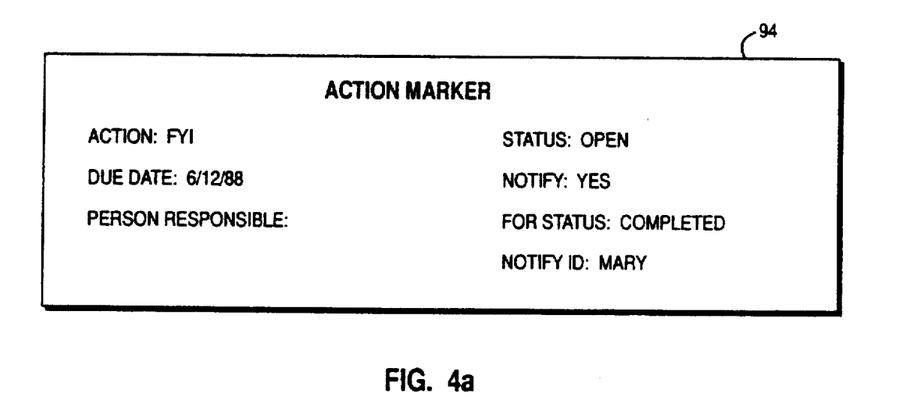
FIG. 4a shows a display of action marker data as implemented by this invention.
Figure 4B:
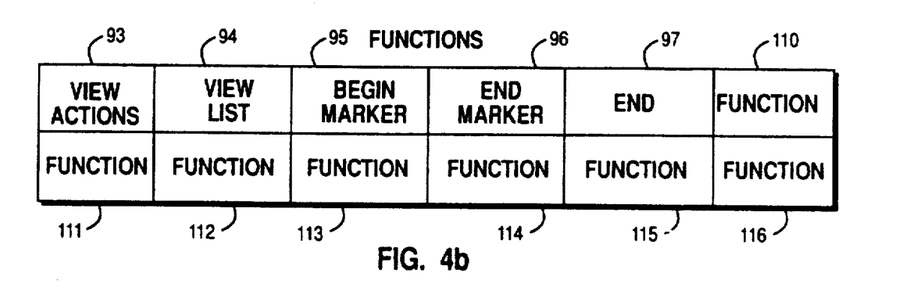
FIG. 4b shows a menu of document management system functions including the view actions, view list, begin marker, end marker, and end functions of this invention.

The preferred embodiment of the present invention enables a requesting end user (EU) to mark-up a selected document and specify an action to be taken by the responding end user (EUR). The requesting EU, interacting with the editor 14 (FIG. 1), activates an action marker function 88 among a plurality of document management system functions 80 through 91 as shown in FIG. 3 to mark a section of the selected document (functions 80-87 and 89-91 being unrelated to this invention). The document management system 10 then displays in FIGS. 4a and 4b an action marker data 92 and additional action marker including View Actions 93, View List 94, Begin Marker 95, End Marker 96, and End 97 respectively, to the requesting EU. (The other document management system functions 110-116 are unrelated to this invention.) The requesting EU, subsequent to having positioned a cursor associated with the display,unit at a beginning of a section to be marked, then selects a begin marker function 95. Thereafter, the cursor is then moved to an end of the section being marked and an end marker function 96 is selected. The editor 14 displays a begin action marker icon or symbol, such as ">>" at the beginning of the section and a end action marker icon or symbol, such as "<<" at the end of the section. The beginning and end action marker icons may be any of a plurality of fancy icons or symbols which are recognizable by all users of the document management system 10. Alternately, a section of a document may be marked by underlining the section to be reviewed, causing the section to appear in bold type, changing the fonts and/or color and/or highlighting the section including the use of reverse video. Additionally, the requesting EU enters the action to be performed, the responding end user to perform the action, and the date by which the action must be completed in the action marker data area shown in FIG. 4a if other than a default due date. The requesting EU then files the document as marked into the library 12 and/or transmits the document, as marked, to the EUR. In either case, the EU sends a message to the EUR setting forth some action to be taken on the document. If the EU filed the document in the library 12, the EUR must be given access to the document stored therein.

Figure 5:
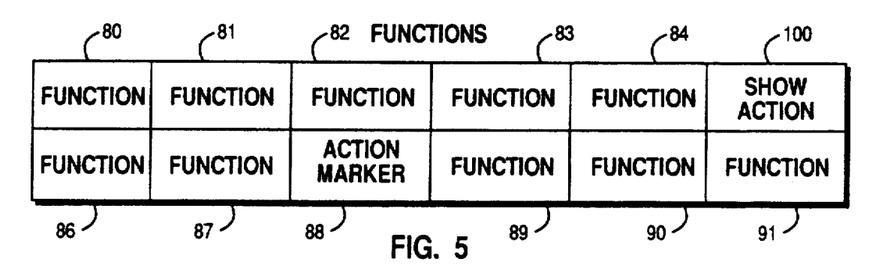
FIG. 5 shows a menu of document management system functions including the show action and action marker functions of this invention.
Figure 6A:
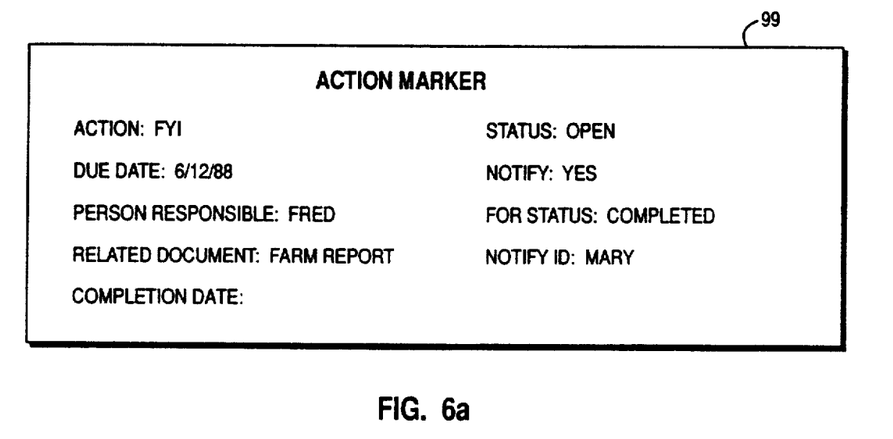
FIG. 6a shows another display of action marker data as implemented by this invention.
Figure 6B:
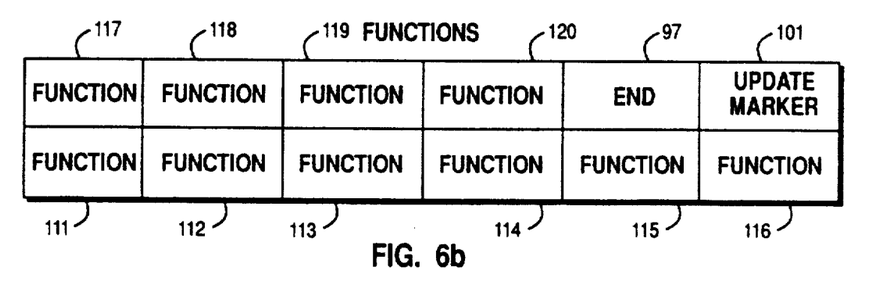
FIG. 6b shows a menu of document management system functions including the end and update marker functions of this invention.

The requesting EU may desire to review an action associated with a selected action marker in the document. The requesting EU activates a show action function 100, which is among a plurality of other document management system functions 80-84, 86-91, shown in FIG. 5. (The other document management system functions 80-84, 86-87, and 89-91 are unrelated to this invention.) The document management system 10 then displays an action marker data area 99 shown in FIG. 6b and an additional action marker function shown as the update marker function 101 among a plurality of other functions which include the end function 97 and other document management functions 111-120. The requesting EU may either change or update the data displayed in the action marker data area or terminate the review of the selected action marker.

Set out below is an illustration of a mark-up application program invocable by a user of the document management system 10 to mark a document and specify actions to be performed by an identified responsible end user within an information processing system. The program is in program design language from which source code and machine code are derivable.

```
BEGIN MARK-UP PROC
    INPUT
        POSITION CURSOR AT BEGINNING OF A
        SELECTED SECTION OF THE DOCUMENT TO
        BE MARKED.
        SPECIFY ACTION MARKER DATA WHICH
        INCLUDES:
            ACTION TO BE PERFORMED;
            ID OF USER RESPONSIBLE TO PERFORM
            ACTION;
            DUE DATE, IF OTHER THAN DEFAULT;
        POSITION CURSOR AT END OF THE SELECTED
        SECTION OF THE DOCUMENT BEING MARKED.
    PROCESS
        ASSIGN A UNIQUE ACTION ID FOR THIS
        ACTION MARKER.
        CREATE A BEGIN ACTION MARKER CON-
        STRUCT FOR THIS ACTION.
        DISPLAY BEGIN ACTION MARKER SYMBOL AT
        POSITION OF CURSOR.
        SET DEFAULT DUE DATE.
        GET ACTION MARKER DATA FROM USER.
        CREATE END ACTION MARKER CONSTRUCT
        FOR THIS ACTION.
        DISPLAY END ACTION MARKER SYMBOL AT
        POSITION OF CURSOR.
        CREATE AN ENTRY IN THE ACTION MARKER
        DATA
        AREA ASSOCIATED WITH THIS ACTION
        MARKER.
        SET THE ACTION ID, ACTION, USER RESPON-
        SIBLE,
        DUE DATE, BEGIN MARKER LOCATION, AND
        END
        MARKER LOCATION IN THE ACTION MAR-
        KER DATA AREA.
END MARK-UP PROC
```

Figure 7:
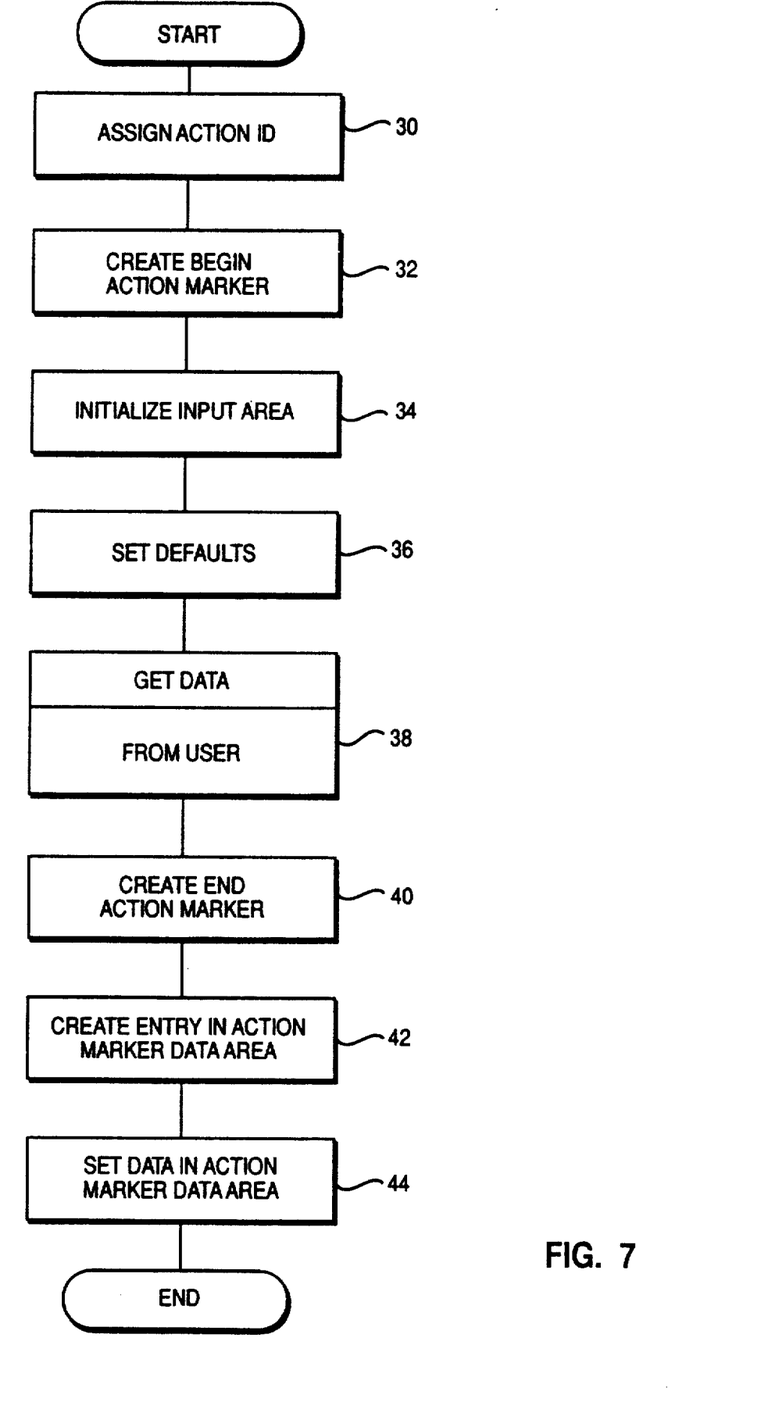
FIG. 7 is a flow-diagram illustrating detailed steps of the method of a mark-up application present invention.

Referring to FIG. 7, there is shown a flow diagram for marking a document. Subsequent to the invocation of the mark-up application program, each action to be performed in association with the selected document has a unique action identifier assigned thereto in step 30. This identifier is also used to couple the begin action marker to the end action marker. In step 32, a begin action marker construct is generated in the data associated with the selected document and corresponds to the present position of the cursor within the document. In step 34, the action marker display data area, to be associated with the action marker, is initialized. The action marker display data area may be a pop-up window, a menu or any other input mechanism. The document management system 10 then sets the defaults for the due date, whether notify is requested, notification status and an notification ID for the requesting EU in the action marker display data area in step 36. The requesting EU may, if desired, override the default due date. In step 38, the document management system 10 then displays the action marker data area and any additional action marker functions to the requesting EU for the entry of data in the display data area and the activation of the additional action marker functions. Lists for person responsible (responding EU), status, and notify ID can be provided to the requesting EU to facilitate the entry of the data into, the data area. The entered data is then made available to the application program. In step 40, an end marker construct is generated in the selected document in response to the activation of the end action marker function. The end marker construct is built in the text data associated with the document and corresponds to the current position of the cursor. Moreover, the end marker construct will include the unique identifier associated with the begin action marker. An entry is created into the action marker data area in the document model object in step 42 and the data, which was entered by the requesting EU in step 38, is then entered into the action marker data area in the document model object in step 44.

Set out below is an illustration of an update action application program invocable by a user of the document management system 10 to update the action marker data area associated with an action marker of the document. The program is in program design language from which source code and machine code are derivable.

```
BEGIN UPDATE ACTION PROC
    INPUT
        MOVE CURSOR TO A SELECTED BEGIN OR
        END ACTION MARKER WITHIN DOCUMENT.
    PROCESS
        GET AND SAVE THE ENTRY ASSOCIATED
        WITH THIS ACTION MARKER.
        SET THE ACTION, PERSON RESPONSIBLE, DUE
        DATE, COMPLETION DATA, NOTIFICATION
        CRITERIA, NOTIFICATION ID AND CURRENT
        STATUS
        FOR DISPLAY TO REQUESTER.
        DISPLAY DATA TO REQUESTER.
        UPDATE THE ENTRY AS SPECIFIED.
        IF THE STATUS IS CHANGED AND THE NEW
        STATUS
            EQUALS THE NOTIFICATION STATUS AND
            REQUESTER WANTS NOTIFICATION, THEN
                SEND A NOTIFICATION MESSAGE TO
                THE ID TO BE NOTIFIED.
        ENDIF
END UPDATE ACTION PROC
```

Figure 8:
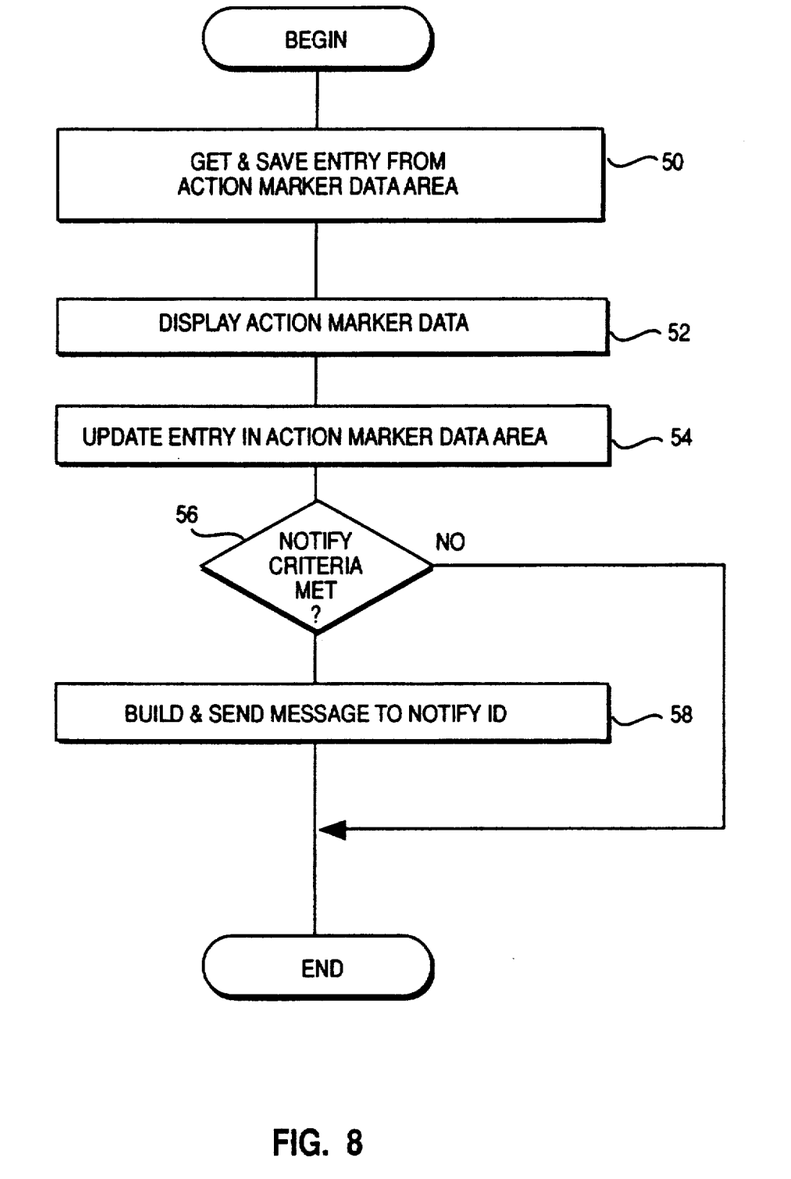
FIG. 8 is a flow diagram illustrating the detailed steps of the method of an update action application of the present invention.

Referring to FIG. 8, there is shown a flow diagram of the update action application program. As noted above, each action to be specified in the document, as marked, is associated with an unique identifier. The identifier is used to couple an action marker entry in an action marker table (not shown) stored in the document management system 10 and the begin and end action markers. Either the begin action marker or the end action marker can be used to access the entry for this action. In step 50, the document management system 10 determines which action marker has been selected by determining the current position of the cursor. The action marker data area associated with the selected action marker is then retrieved from storage and displayed to the requesting EU in step 52. In step 54, the requesting EU enters data to update that which is currently displayed in the action marker data area. Step 56 determines whether the notification criteria has been met. In essence, the determination is whether (1) the status has been changed and if the new status equals the notification status and (2) whether the requesting EU wanted notification. If the requesting EU notification and the new status equals the notification status, a message is generated and transmitted to the requesting EU in step 58.

In summary, the requesting EU, marks a section of a document to be reviewed by a responding EU. The action to be performed by the responding EU, an identification of the responding EU and the due date, which are specified by the requesting EU, becomes a part of the document and are associated with a begin action marker and an end action marker. The requesting EU also specifies notification criteria, notify ID and status for the action to be performed. Multiple sections can be marked for review by the same responding EU or other responding EUs. After the document has been marked, the document is filed and the responding EU or EUs may be given access to the document to complete the review thereof. Alternately, the document can be transmitted to the responding EU or EUS for review. When the responding EU or EUs have completed their respective review of the document, the status associated with the action is updated. If the updated status is the same as the notification criteria, a message is automatically transmitted to the end user associated with the notify ID.

What is claimed is:

1. A method of marking a document stored within a data processing system for action, said method comprising the steps performed by said data processing system of:
    inserting a begin action marker control code within said document denoting the beginning of a portion of said document on which action is to be performed;
    inserting an end action marker control code within said document denoting the end of a portion of said document on which action is to be performed;
    creating an action marker data object within said document and linked to a portion of said document bounded by said begin and end action marker codes, said object including
    (a) a specification of a first action to be performed on said document,
    (b) an identification of a first user responsible to perform said first action on said document,
    (c) a notification requirement indicating whether a second user will be notified upon reaching a particular status of the action,
    (d) a specification of said particular status for triggering a notification, and
    (e) an identification of a second user to receive said notification;
    automatically assigning an identifier for an action to be performed on said document;
    storing said identifier for said action with said action marker data object; and
    displaying, on a visual display device of said data processing system, said action marker data object to a requesting end user.

2. The method of claim 1 further wherein said step of displaying is prior to including within said data object one of
    (a) said specification of said first action to be performed on said document,
    (b) said identification of said first user responsible to perform said first action on said document,
    (c) said notification requirement indicating whether said second user will be notified upon reaching said particular status of the action,
    (d) said specification of said particular status for triggering a notification, and
    (e) said identification of said second user to receive said notification.

3. The method of claim 2 further comprising inserting, by an operator of said data processing system said specifications, said identifications, and said notification requirement.

4. The method of claim 3 further comprising updating data in said data object responsive to completion of said first action.

5. A data processing system for marking a stored document for action, comprising:
    means responsive to an operator performed selection for inserting a begin action marker control code within said document denoting the beginning of portion of said document on which action is to be performed;
    means responsive to an operator performed selection for inserting an end action marker cotnrol code within said document denoting the end of a portion of said document on which action is to be performed;
    means responsive to said means for inserting a begin action marker control code for creating an action marker data object within said document and linked to a portion of said document bounded by said begin and end action marker codes, said object including
    (a) a specification of a first action to be performed on said document,
    (b) an identification of a first user responsible to perform said first action on said document,
    (c) a notification requirement indicating whether a second user will be notified upon reaching a particular status of the action,
    (d) a specification of said particular status for triggering a notification, and
    (e) an identification of a second user to receive said notification;
    means responsive to said means for creating for automatically assigning an identifier for an action to be performed on said document;
    means responsive to said means for assigning for storing said identifier for said action with said action marker data object; and
    means for displaying, on a visual display device of said data processing system, said action marker data object to a requesting end user.

6. The data processing system of claim 5 further comprising means for revising, by said operator of said data processing system said specifications, said identifications, and said notification requirement.

7. The data processing system of claim 6 further comprising means for updating data in said data object responsive to completion of said first action.

8. A data processing program product for marking a document for action, comprising a media on which is recorded:
   instruction means responsive to an operator performed selection for causing a begin action marker control code to be inserted within said document denoting the beginning of a portion of said document on which action is to be performed;
   instruction means responsive to an operator performed selection for causing an end action marker control code to be inserted within said document denoting the end of a portion of said document on which action is to be performed;
   instruction means responsive to said instruction means for inserting a begin action marker control code for causing creation of an action marker data object within said document and linked to a portion of said document bounded by said begin and end action marker codes, said object including
   (a) a specification of a first action to be performed on said document,
   (b) an identification of a first user responsible to perform said first action on said document,
   (c) a notification requirement indicating whether a second user will be notified upon reaching a particular status of the action,
   (d) a specification of said particular status for triggering a notification, and
   (e) an identification of a second user to receive said notification;
   instruction means, responsive to said instruction means for causing creation, for automatically assigning an identifier for an action to be performed on said document;
   instruction means, responsive to said instruction means for assigning, for storing said identifier for said action with aid action marker data object; and
   instruction means for causing display, on a visual display device of said data processing system, of said action marker data object to a requesting end user.

9. The data processing program product of claim 8 further comprising instruction means providing for revising, by said operator for said data processing system said specifications, said identifications, and said notification requirement.

10. The data processing program product of claim 9 further comprising instruction means for updating data in said data object responsive to completion of said first action.

* * * * *

UNITED STATES PATENT AND TRADEMARK OFFICE
CERTIFICATE OF CORRECTION

PATENT NO. : 5,063,495

DATED : November 5, 1991

INVENTOR(S) : Margaret G. MacPhail

It is certified that error appears in the above—identified patent and that said Letters Patent is hereby corrected as shown below:

```
    On the title page  in the title, line 2, please delete
                       "STATES" and insert --STATUS--;
                                        line 3, please delete
                       "MARKET" and insert --MARKER--;
Col. 8, line 34, before "portion", please insert --a--; and
Col. 10, line 21, please delete "for" and insert --of--.
```

Signed and Sealed this

First Day of June, 1993

Attest:

MICHAEL K. KIRK

Attesting Officer

Acting Commissioner of Patents and Trademarks